United States Patent [19]

Miyamoto et al.

[11] Patent Number: 5,857,122
[45] Date of Patent: Jan. 5, 1999

[54] VIBRATION COMPENSATION DEVICE FOR A CAMERA AND AN ASSOCIATED VISUAL DISPLAY

[75] Inventors: Hidenori Miyamoto, Urayasu; Hiroshi Wakabayashi, Yokohama; Yoshihisa Kitagawa, Kashiwa; Yoshio Imura, Kawasaki; Tatsuo Amanuma, Ageo, all of Japan

[73] Assignee: Nikon Corporation, Tokyo, Japan

[21] Appl. No.: 787,996

[22] Filed: Jan. 23, 1997

Related U.S. Application Data

[63] Continuation of Ser. No. 377,962, Jan. 25, 1995, abandoned.

[30] Foreign Application Priority Data

| Jan. 31, 1994 | [JP] | Japan | 6-027512 |
| Jan. 31, 1994 | [JP] | Japan | 6-027513 |
| Jan. 31, 1994 | [JP] | Japan | 6-027514 |
| Apr. 28, 1994 | [JP] | Japan | 6-092652 |

[51] Int. Cl.$^6$ .................................................. G03B 17/00
[52] U.S. Cl. .................................................. 396/55
[58] Field of Search ........................ 396/52, 55; 348/208

[56] References Cited

U.S. PATENT DOCUMENTS

| 5,153,633 | 10/1992 | Otani | 354/430 |
| 5,204,709 | 4/1993 | Sato | 354/266 |
| 5,245,378 | 9/1993 | Washisu | 354/410 |
| 5,307,113 | 4/1994 | Egawa | 354/430 |
| 5,337,098 | 8/1994 | Imafuji et al. | 354/70 |
| 5,353,091 | 10/1994 | Ishida et al. | 354/410 |
| 5,416,554 | 5/1995 | Hamada et al. | 354/400 |
| 5,448,331 | 9/1995 | Hamada et al. | 354/403 |
| 5,499,068 | 3/1996 | Satoh et al. | 354/106 |
| 5,537,185 | 7/1996 | Ohishi et al. | 354/472 |
| 5,539,496 | 7/1996 | Wakabayashi et al. | 354/430 |
| 5,546,159 | 8/1996 | Imura et al. | 354/472 |
| 5,572,279 | 11/1996 | Ohsawa | 396/52 |

*Primary Examiner*—Safet Metjahic
*Assistant Examiner*—John Chizmar

[57] ABSTRACT

A vibration compensation device for use in an optical imaging system, such as a camera, having a vibration detection unit to detect vibrations in the camera and a vibration compensation unit to drive a vibration compensation optical lens perpendicular to an optical axis to correct for the vibrations detected by the vibration detection unit. A display unit, preferably a lamp, is provided to indicate the detection of vibrations by the vibration detection unit. Further, the vibration detection device is provided with a switch to allow the user to select whether the vibration compensation device is to be enabled or disabled. When the vibration detection device is enabled, upon the halfpress of a shutter release button, the vibration detection unit is initialized to determine the point at which the angular velocity of the vibration compensation optical lens equals 0. Thereafter, the vibration compensation unit drives the vibration compensation optical lens in response to the signals from the vibration detection unit. Conversely, when the vibration compensation device is disabled, a wait time, equal to the amount of time otherwise required to detect where the angular velocity equals 0, is waited so as to present the photographer with the same feel regardless of whether he takes a picture with the vibration compensation device enabled or disabled.

12 Claims, 13 Drawing Sheets

FIG. 12
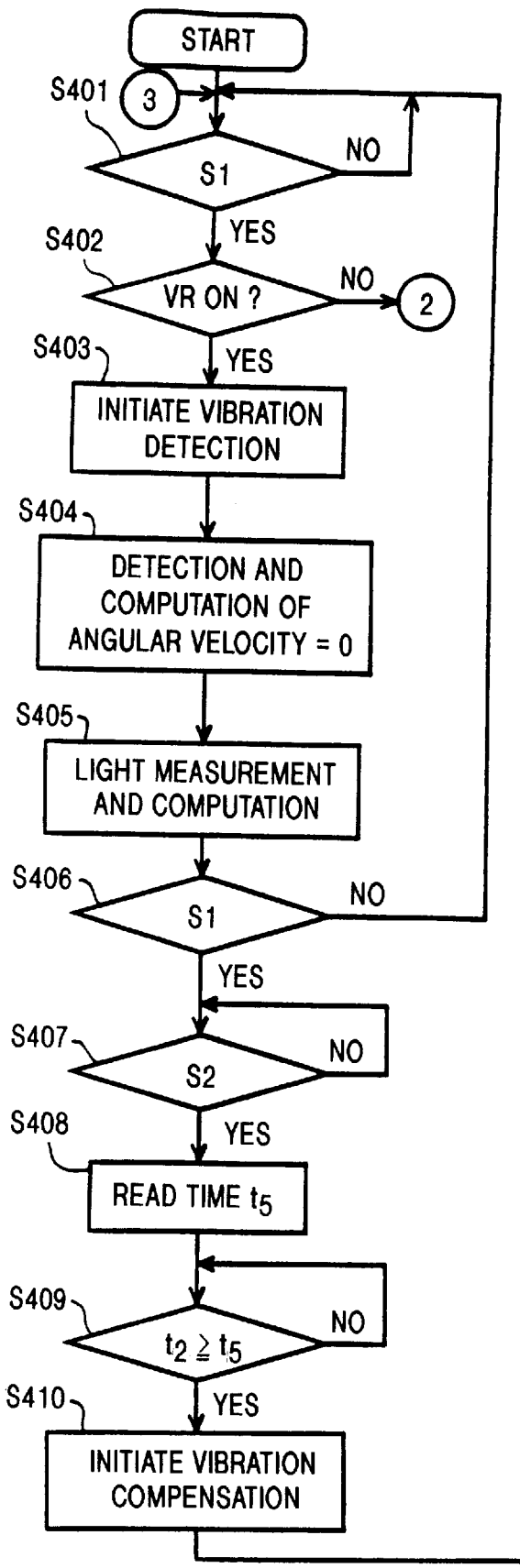
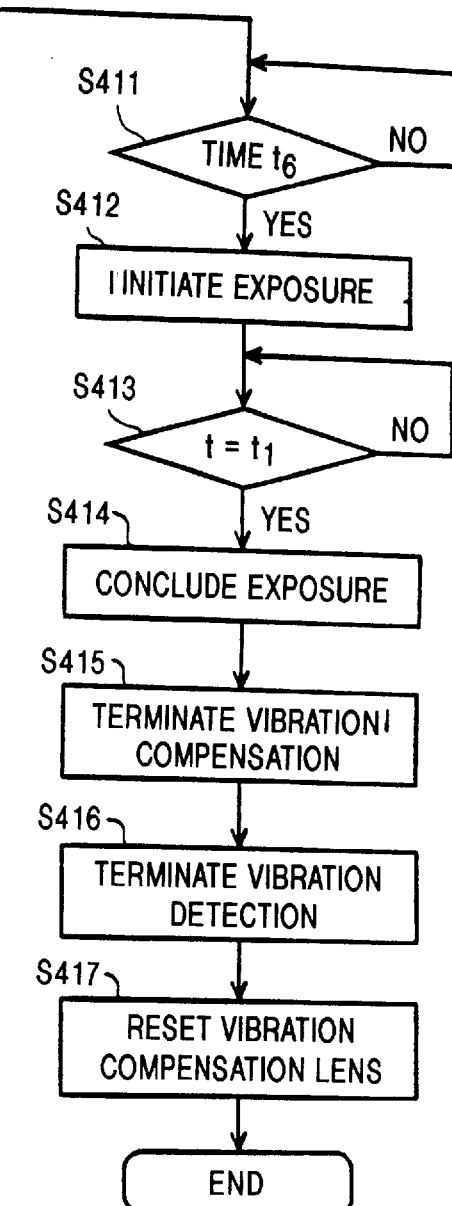

VIBRATION COMPENSATION DEVICE FOR A CAMERA AND AN ASSOCIATED VISUAL DISPLAY

This application is a continuation, of application Ser. No. 08/377,962, filed Jan. 25, 1995, now abandoned.

BACKGROUND OF THE INVENTION

1. Field of the Invention

The present invention relates to a vibration compensation device for a camera which corrects image blur caused by, for example, hand vibration, and in particular, relates to a camera having a vibration compensation device that provides a visual indication of the presence of vibrations and presents the user with the same sense of timing when taking a picture while using the vibration compensation device as when taking a picture without using the vibration compensation device.

2. Description of the Related Art

In known cameras having a vibration compensation device using a vibration compensation detection sensor to detect vibrations which may cause image blur, only information related to exposure and the shutter speed has heretofore been displayed to the photographer to assist in determining whether a suitable photograph can be produced. However, even if the exposure and shutter speed are suitable for photography, vibrations in the camera can still produce an unsuitable photograph, i.e. if the photographer takes a picture when there is too much vibration, the photograph is wasted.

This situation is compounded in recent cameras which are remarkably lighter and more prone to vibration than prior cameras. The photographer may not notice the weight of the camera even when taking photographs for a long period of time. As the cameras have become lighter, more and more blurred photographs are produced in which the subject image is a vibrating locus, due to, for example, vibrations in the hand of the photographer. Moreover, in situations which call for the use of a slow shutter speed, due to, for example, the brightness of the subject, the sensitivity of the film used, and the aperture of the lens being used, the photographer needs to prevent vibration in order to produce an acceptable photograph. This can be accomplished by extensive practice at holding the camera still, installing the camera on a tripod, raising the sensitivity of the film used, using a lens with a larger aperture, and/or using a vibration compensation device.

Known vibration compensation devices use an angular velocity sensor, as a vibration detection unit, incorporated into the camera body or a photographic lens. When positioned in the camera body, the angular velocity sensor detects the vibration in the camera body, or photographic lens, and outputs a signal indicative of the detected vibrations. A computational unit, incorporated into the camera, uses the signal to compute the amount and the direction of movement of a subject image on a focal plane, that is, on a photographic screen of the photographic film, caused by the vibration. Further, the angular velocity sensor may also output the relative detection value of how much change occurs from a given detection value to a next detection value. When computing the amount and direction of movement of the subject image using the relative detection value, the computational unit executes computations to convert the relative detection value to an absolute amount of movement from a standard value where angular velocity equals 0. Based on the computations, a vibration compensation unit, typically comprising an actuator, incorporated into the photographic lens and capable of driving one part of a photographic optical system in a direction perpendicular to the optical axis of the photographic optical system, drives one part of the photographic optical system so as to cancel out the amount of movement of the subject image. These operations are typically initiated by manipulating a shutter release button, usually by pressing the shutter release button halfway. These known vibration compensation devices reduce the vibration of the subject image on the photographic screen during exposure.

The signal output from the angular velocity sensor immediately after initiating vibration detection lacks reliability because the angular velocity sensor has not entered a stable state. It is therefore necessary to begin computations, by determining the point where the angular velocity equals 0, after enough time has elapsed for the output of the angular velocity sensor to become stable. Angular velocity is said to equal 0 at a point equal to the average value of the detection values as measured within a set time period starting from just after the beginning of vibration detection. The set time period is equal to the time required for the detection output of the angular velocity sensor to become stable plus the time required to calculate where the angular velocity equals 0. The time required in order to calculate where the angular velocity equals 0 is determined by the time it takes the computational unit to compute the amount and direction of motion of the subject image. A longer set time period allows more angular velocity detection values to be measured, which gives a higher precision in calculating the points where the angular velocity equals 0. However, if the set time period becomes too long, then difficulty arises in taking the photograph. Moreover, if the set time period is too short, the precision of determining the point where the angular velocity equals 0 is lowered.

Thus, the time required for the series of operations accompanying the operation of the shutter release button until exposure of the photographic screen can begin (hereinafter referred to as "release time lag") takes longer when a vibration compensation unit is used because of the extra calculations. This can cause problems when a photographer attempts to take a photograph of a moving subject while using the vibration compensation device. As the release time lag is not the same as when taking a photograph without using the vibration compensation device, it is difficult to determine the best time for operating the shutter release button, and the sensation of pressing the shutter release button changes completely. Therefore, not only is it difficult to obtain the photograph as intended, but it is typically necessary to conduct photography several times until a satisfactory photograph is obtained, due to the different timing of the shutter release operation, i.e. differences in the release lag time. This presents an obstacle to the photographer when taking photographs while using the vibration compensation device.

SUMMARY OF THE INVENTION

Accordingly, it is an object of the present invention to prevent wasted photographs by providing a camera with a vibration compensation device using a vibration compensation unit in which a display device operates, when a vibration compensation execution signal generation unit outputs execution signals, displaying the suitability of taking a photograph and information indicating image blur.

It is another object of the invention to provide a camera having a first selection state which permits operation of a vibration compensation device and a second selection state which prohibits operation of the vibration compensation device, the camera being configured such that the time from after operation of the vibration compensation device is initiated corresponding to the external operation of an operation member and until a memory operation unit is made to operate, and the time after waiting the specified time corresponding to the external operation of the operation member until the memory operation unit is made to operate, are equal, such that, irrespective of the selection state of the vibration compensation device, the photographer feels the same timing, when taking a photograph.

It is a further object of the present invention to prevent wasted photography by displaying information related to the suitability for photography including image blur information.

It is yet a further object of the invention to provide an a camera having a vibration compensation device that sets a release time lag to be the same irrespective of the operation state of the vibration compensation device.

Additional objects and advantages of the invention will be set forth in part in the description which follows, and, in part, will be obvious from the description, or may be learned by practice of the invention.

Objects of the present invention are achieved in a vibration compensation device suitable for use in an optical imaging system to reduce blur in the image, the vibration compensation device comprising a vibration detection unit to detect vibrations which would blur the image, a vibration compensation unit to compensate for vibrations, a control unit to cause the vibration compensation unit to compensate for the vibrations detected by the vibration detection unit when vibrations which would blur the image are detected by the vibration detection unit, and a display unit to output a visual display indicating the presence of vibrations which would blur the image when the control unit causes the vibration compensation unit to compensate for the vibrations.

Objects of the present invention are further achieved by a vibration compensation device suitable for use in an optical imaging system to reduce blur in the image during exposure, the vibration compensation device comprising a vibration detection unit to detect vibrations which would blur the image, a vibration compensation unit to compensate for vibrations, a vibration compensation selection switch having a first position to indicate that the vibration compensation unit should be enabled and a second position to indicate that the vibration compensation unit should be disabled, and a control unit to cause the vibration detection unit to detect vibrations in response to the manipulation of the release button, and if the vibration compensation selection switch is in the first position to cause the vibration compensation unit to compensate for the vibrations detected by the vibration detection unit.

Objects of the present invention are also achieved by a vibration compensation device suitable for use in an optical imaging system to reduce blur in the image during exposure, the vibration compensation device comprising a vibration detection unit to detect vibrations which would blur the image, a vibration compensation unit to compensate for vibrations, a vibration compensation selection switch having a first position to enable the vibration compensation unit and a second position to disable the vibration compensation unit, and a control unit to initiate exposure after a time period has elapsed upon the manipulation of the release button, the time period being the same when the vibration compensation selection switch is in the first position and when the vibration compensation switch is in the second position.

Objects of the present invention are also achieved in a camera having a vibration compensation device equipped with an vibration detection unit to detect vibration which might cause image blur, a vibration compensation unit to correct for image blur, a vibration compensation execution signal generation unit to generate execution signals to initiate the operation of the vibration compensation unit, and a display unit to display image blur based on the detection output of the vibration compensation device when the execution signals are output.

Objects of the present invention are further achieved in a camera comprising a vibration compensation device having an operation member capable of external manipulation, a memory operation unit which causes the memorization of the photographic image on a memory medium when the operation member is manipulated, a vibration detection sensor which detects the vibration of the camera, a vibration compensation unit to make corrections to suppress vibration of the photographic image to be memorized based on the detection results of a vibration detection sensor, a selection unit which can select a first selection mode in which the vibration compensation device is enabled and a second selection state in which the vibration compensation unit is disabled and a control unit which identifies the selection mode and when the first selection mode is elected, the operation of the vibration compensation device begins at a first specified time after the manipulation of the operation member and after operation begins, initiates operation of the memory operation unit at a second specified time and if the second selection mode is selected, the memory operation unit is made to operate after having waited a period equal to the first specified time plus the second specified time after the manipulation of the operation member.

Objects of the present invention are also achieved in a method of exposing an image in an optical system comprising detecting vibrations which would cause blur in the image when a user half presses a release button, displaying an indication to the user of the detected vibrations, determining whether the user desires to compensate for detected vibrations, initiating exposure of the image upon the full press of the release button and compensating for the detected vibrations if the user desires to compensate for vibrations, and initiating exposure of the image upon the full press of the release button if the user does not desire to compensate for vibrations.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 12 is a flow chart showing the operation of a control unit in a camera according to a third preferred embodiment of the present invention.

DESCRIPTION OF THE PREFERRED EMBODIMENTS

Figure 1:
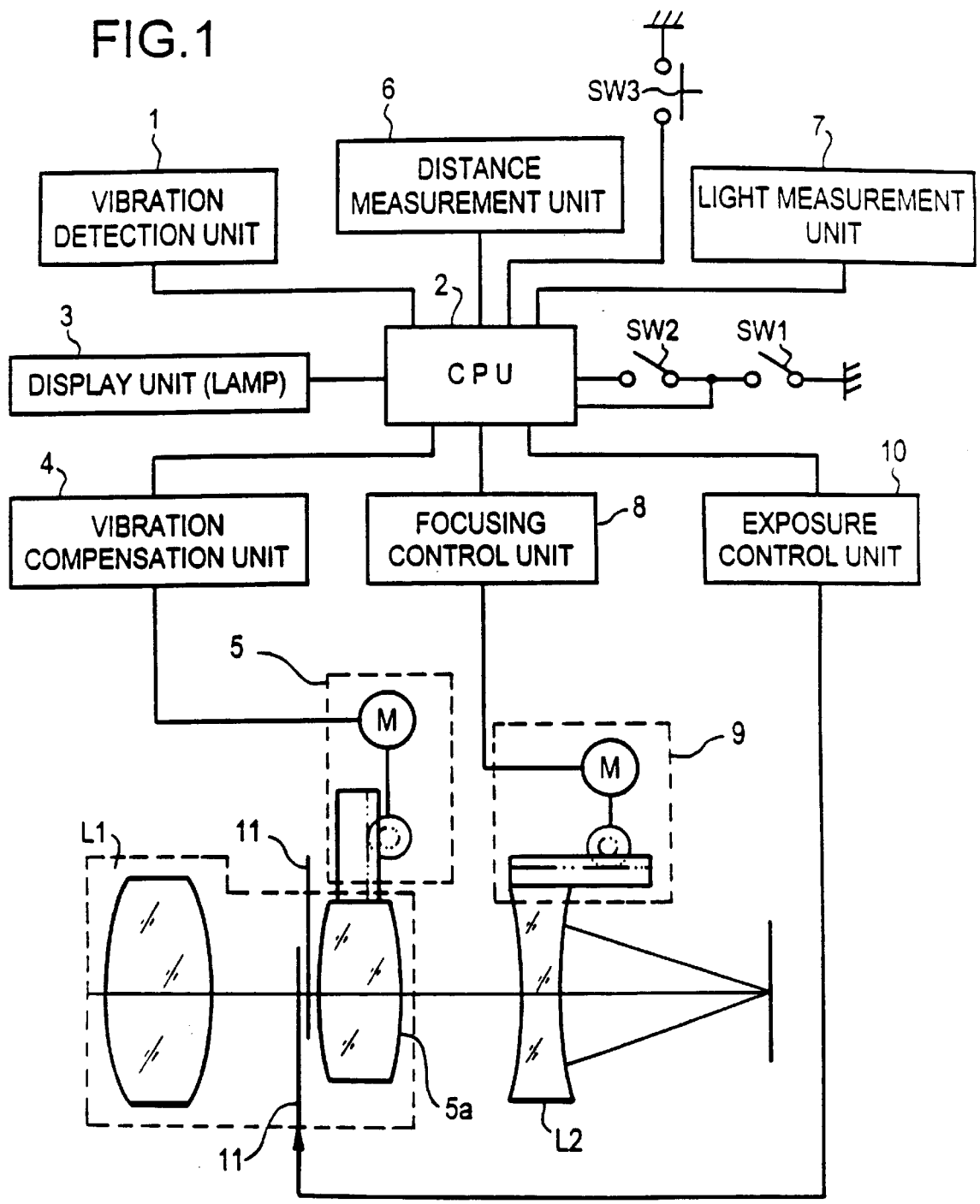
FIG. 1 is a block diagram showing a camera according to a first preferred embodiment of the present invention.

Reference will now be made in detail to the present preferred embodiments of the present invention, examples of which are illustrated in the accompanying drawings, wherein like reference numerals refer to like elements throughout.

FIG. 1 is a block diagram showing a camera equipped with a vibration compensation device in accordance with a first preferred embodiment of the present invention. The vibration compensation device generally comprises a vibration detection unit 1, a vibration compensation unit 4, a drive system 5, and a vibration compensation optical system 5a.

In accordance with the first preferred embodiment, the vibration detection unit 1 comprises an angular velocity sensor. The vibration detection unit 1 is turned ON by a half push switch SW1. The half push switch SW1 is operated by an external manipulation, i.e. a half push, of a manipulation member, for example, a shutter release button (not shown). A CPU 2 activates the vibration detection unit 1, in response to the halfpush switch SW1 turning ON, and after a specified time has elapsed, the vibration detection unit 1 detects the amount of vibration, i.e. amount of displacement or amount of vibration in a camera body (not shown). The CPU 2, together with the shutter release button, and the halfpush switch SW1 operates as a detection control unit. A lamp 3, for example an LED, forms a display unit along with an optional green lamp (not shown) within the viewfinder (not shown). The lamp 3 displays a result of light measurements obtained by a light measurement unit 7. During operation, the CPU 2 activates the vibration detection unit 1, and controls the lamp 3, to be lit or extinguished, based on the output signals from the vibration detection unit 1.

The CPU 2 sets the shutter time based on the light measurement results, indicating subject brightness, from the light measurement unit 7, which comprises, for example, a CCD. If the halfpush switch SW1 is ON and the shutter time is greater than a specified value, preferably a time which is the reciprocal of the focal point distance of the photographic lens, for example, if the focal point distance of the photographic lens is 80 millimeters, the specified value would be 1/80 seconds. If, however switch SW3, serving as a vibration compensation selection unit, is in the ON position, the vibration detection unit 1 is activated and the lamp 3 flashes in a first state. After a specified time has elapsed, if the output signals form the vibration detection unit 1 indicates that the amount of vibration of the camera body is smaller than a specified amount, the CPU 2 lights the lamp 3 in a steady state. Thus, using the output of the lamp 3, the photographer can determine whether conditions are suitable for photography.

If the switch SW1 is ON, and the switch SW3 is ON, the CPU 2 commands a vibration compensation unit 4 to correct for image blur corresponding to the output of the vibration detection unit 1. The vibration compensation unit 4 corrects for image blur by activating the drive system 5 of a photographic optical system L1 to drive the vibration compensation optical system 5a perpendicular to the optical axis of the photographic optical system L1. The distance measurement unit 6, comprising for example, an optoelectric conversion element, an electric charge accumulation element, a CCD, or a SPD, and the light measurement unit 7 are widely known distance measurement units and light measurement units, respectively. Thereafter, the CPU 2 activates the distance measurement unit 6 and light measurement 7 in response to the user pushing the shutter release button (not shown) halfway down, thereby turning the switch SW1 ON. The CPU 2 commands a focusing control unit 8 to conduct automatic focusing (AF) based on the output signals of the distance measurement unit 6 which gives a light measurement results and a value indicating an amount of defocus. The focusing control unit 8 performs automatic focusing (AF) by driving a photographic optical system L2 along the optical axis using a drive system 9. Moreover, the CPU 2 commands an exposure control unit 10 to control the aperture, based on the detection signals of light measurement unit 7 which give light measurement results, by driving an aperture member 11.

Figure 2:
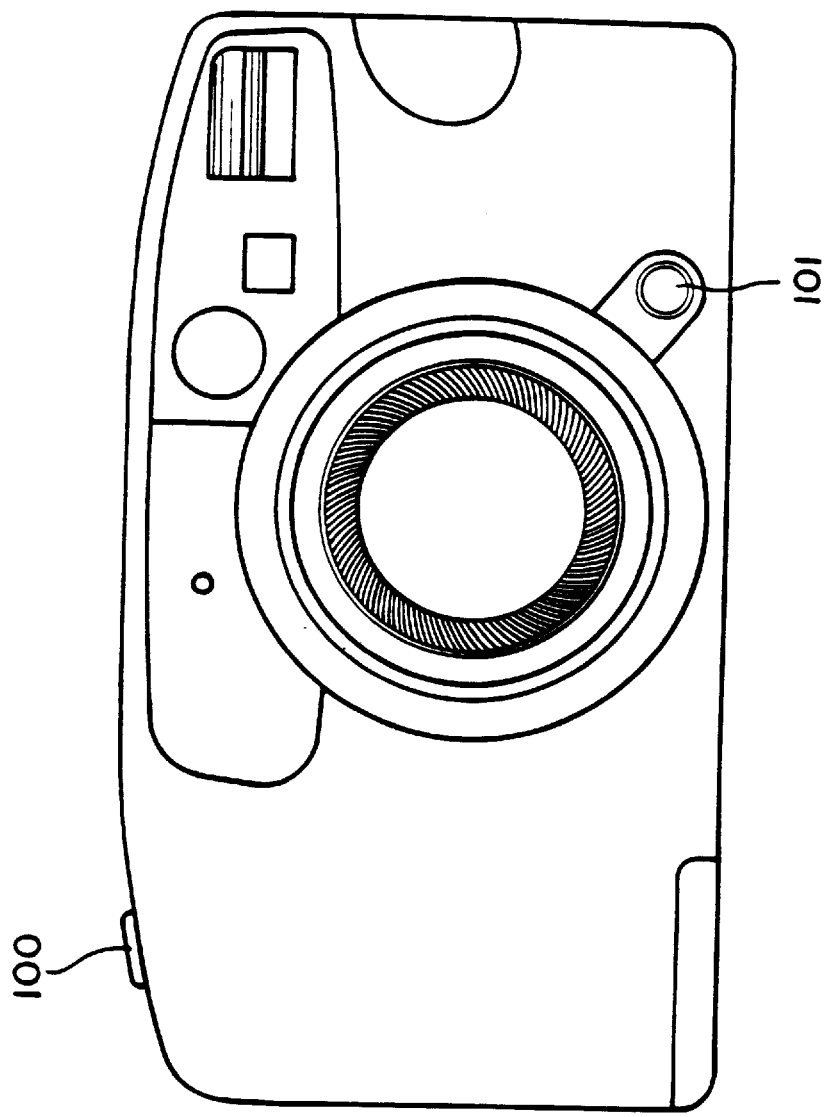
FIG. 2 is a front view of a camera according to the first preferred embodiment of the present invention.

FIG. 2 is a front view of a camera in accordance with the first preferred embodiment. A shutter release button 100 turns the switch SW1 ON with a half press and the switch SW2 ON with a full press. A switch button 101 serves as a vibration compensation selection switch and corresponds to switch SW3 in FIG. 1. The switch button 101 is preferably a self return switch that goes ON while being held down by external manipulation, and when released, goes OFF. When switch SW3 is ON, the vibration compensation unit 4 is driven based on the detection output of the vibration detection unit 1.

Figure 3:
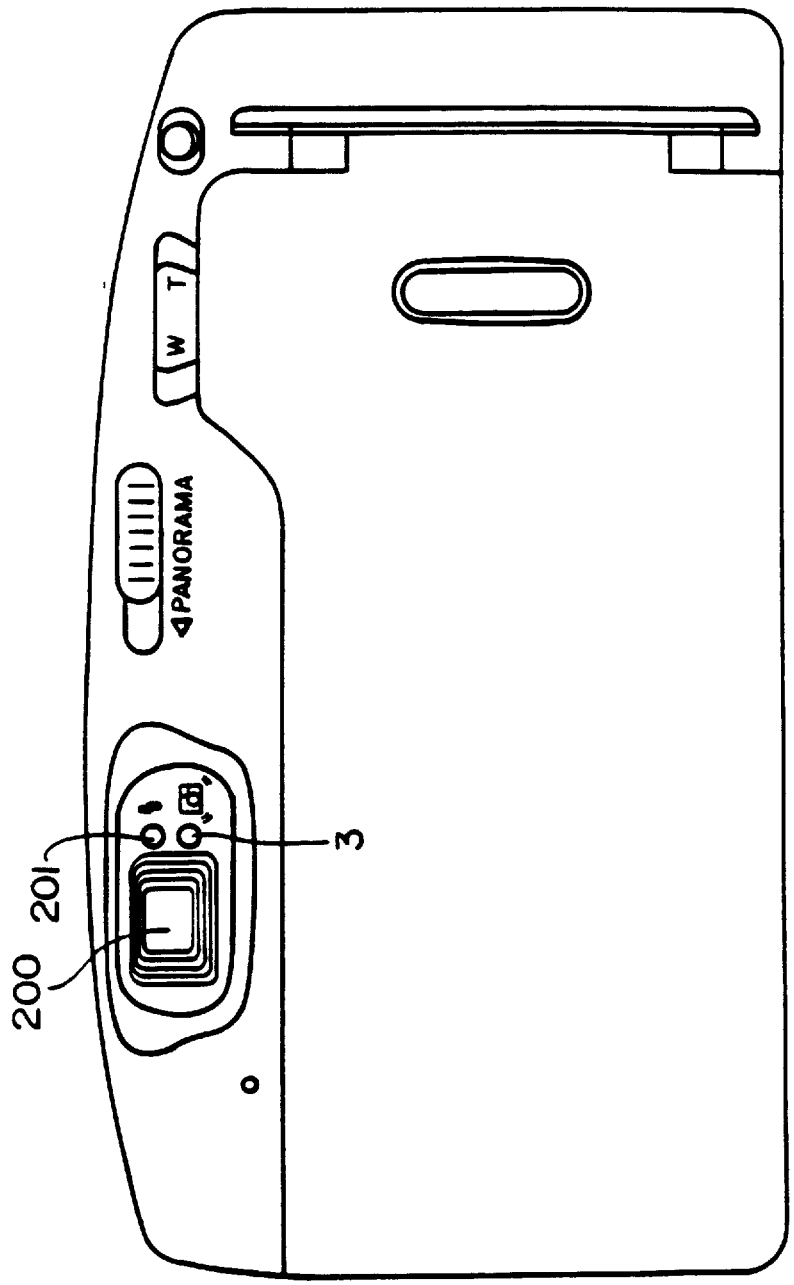
FIG. 3 is a back view of a camera according to the first preferred embodiment of the present invention.

FIG. 3 is a rear view of a camera indicating the positional relationship of the lamp 3 and the viewfinder eye piece. The lamp 3 need not be a lamp within the viewfinder, rather it may be provided in the vicinity of the viewfinder window on the back surface of the camera. A display lamp 201 is provided to indicate that the strobe charge is finished.

Figure 4:
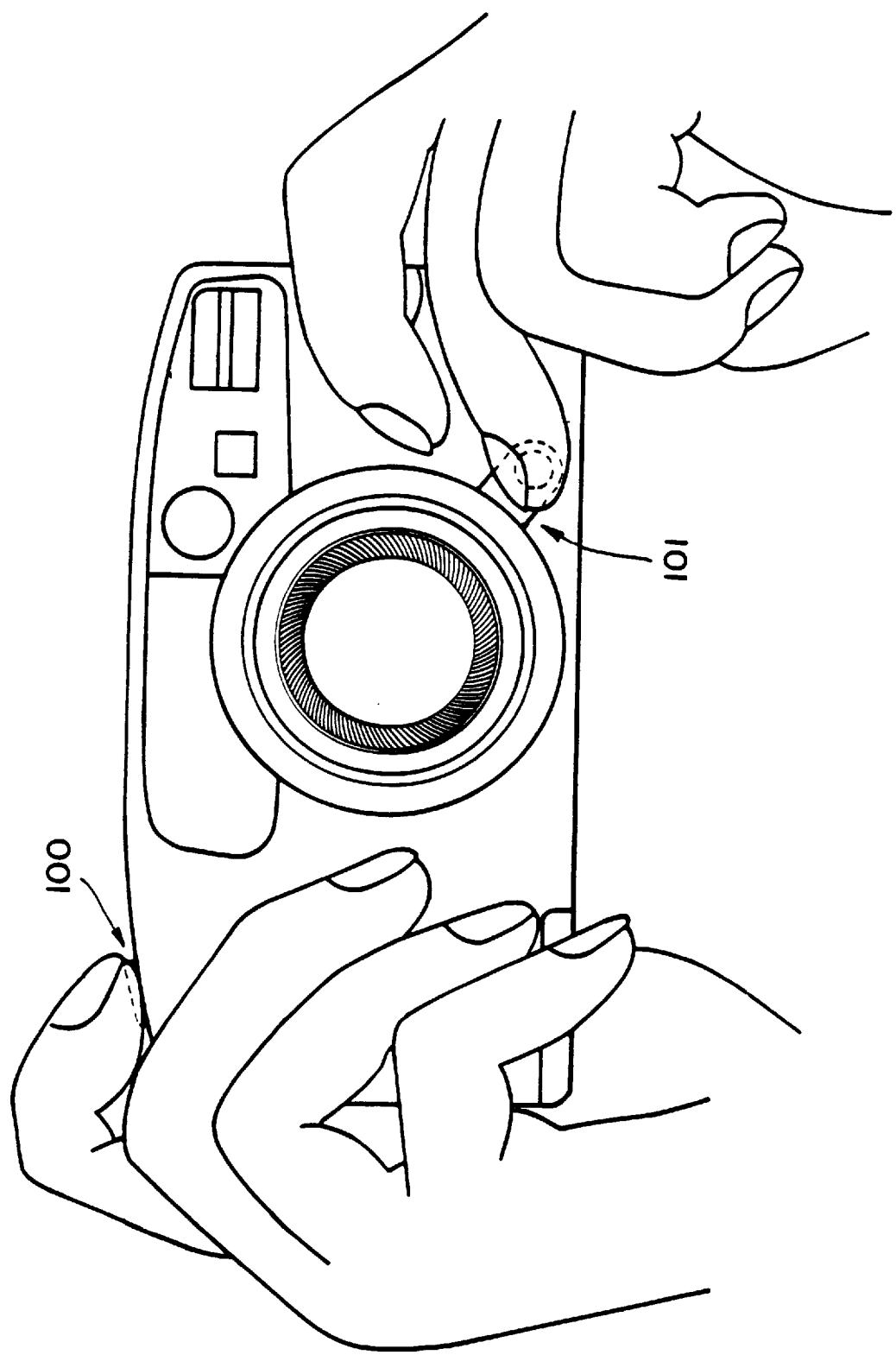
FIG. 4 is a front view of a camera according to the first preferred embodiment of the present invention.

FIG. 4 is a front view of a camera according to the first preferred embodiment showing the posture by which the photographer holds the camera in order to operate the switch button 101. Because the switch button 101 is positioned on the opposite side of the photographic lens from the shutter release button 100, it is always necessary to hold the camera with both hands when manipulating switch button 101 to select vibration compensation. This posture further serves to reduce camera vibration, and more specifically, helps reduce the vibration which accompanies the termination of the vibration compensation operation.

Figure 5:
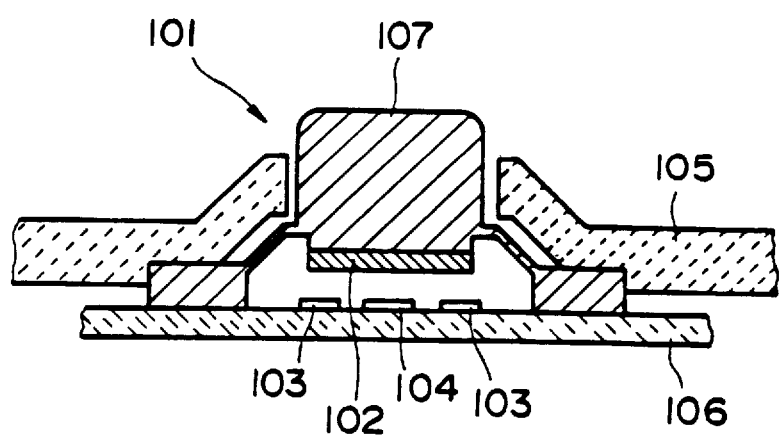
FIG. 5 is a cross-sectional view of a switch for use in a camera according to the first preferred embodiment of the present invention.

FIG. 5 is a side cut-away view of the vibration compensation termination switch, i.e. the switch button 101. A rubber button 107 is held within a camera cover 105. A conductive rubber strip 102, comprising for example, a conductive member, a non-metallic conductive member, an elastic member, or an elastic conductive member, is attached to the underside of the rubber button 107. A printed routing substrate 106 supports conductive parts 103 and 104. When the rubber button 107 is pressed, the conductive parts 103 and 104 are shorted by the conductive rubber strip 102, and the switch button 101 enters the ON state. When the rubber button 107 is released, the conductive rubber strip 102 is separated from the conductive parts 103 and 104 by the elasticity of the rubber button 107, and the switch button 101 enters the OFF state.

Figure 6:
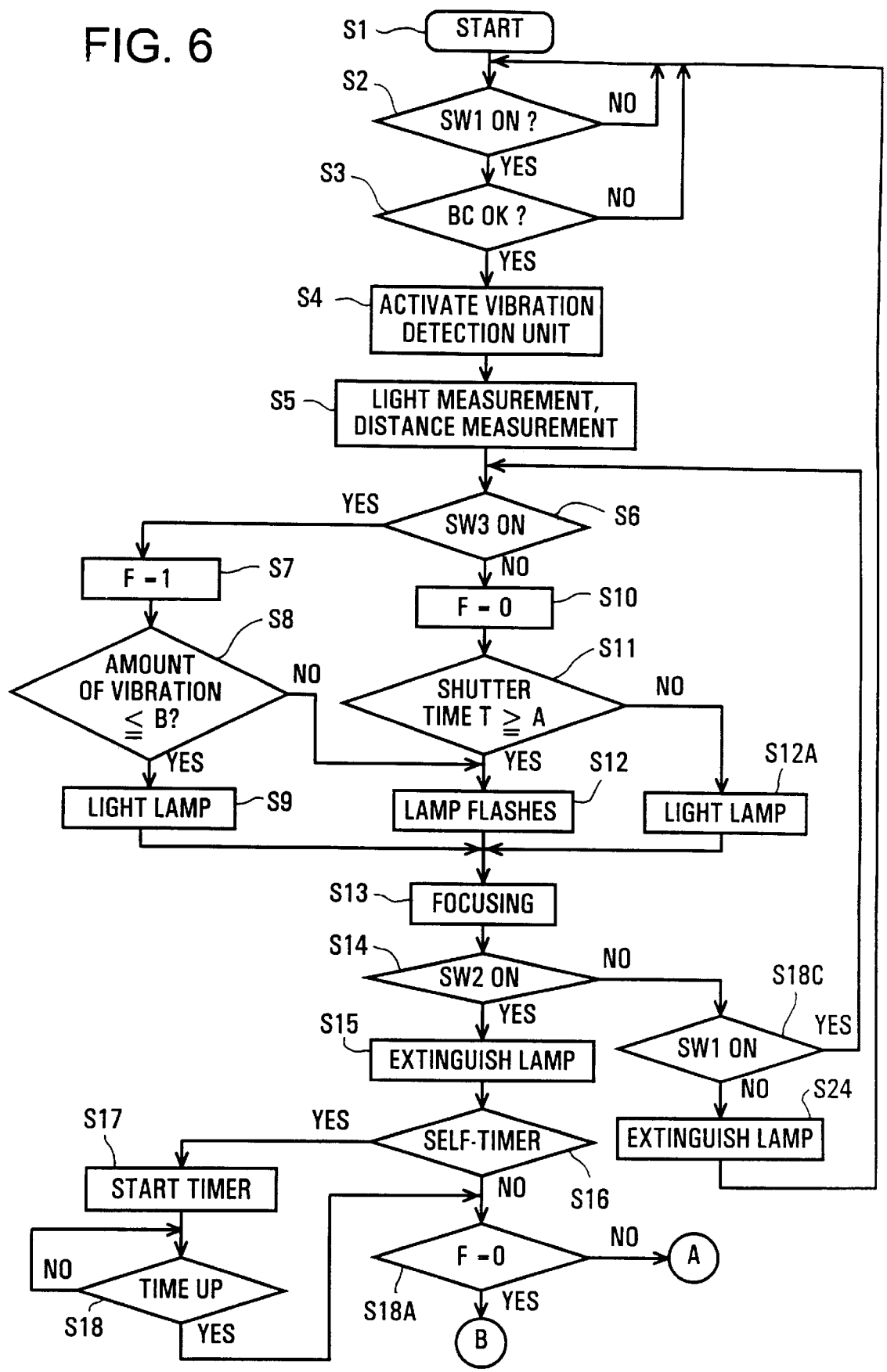
FIG. 6 is a flow chart showing the operation of a camera in accordance with the first preferred embodiment of the present invention.
Figure 7:
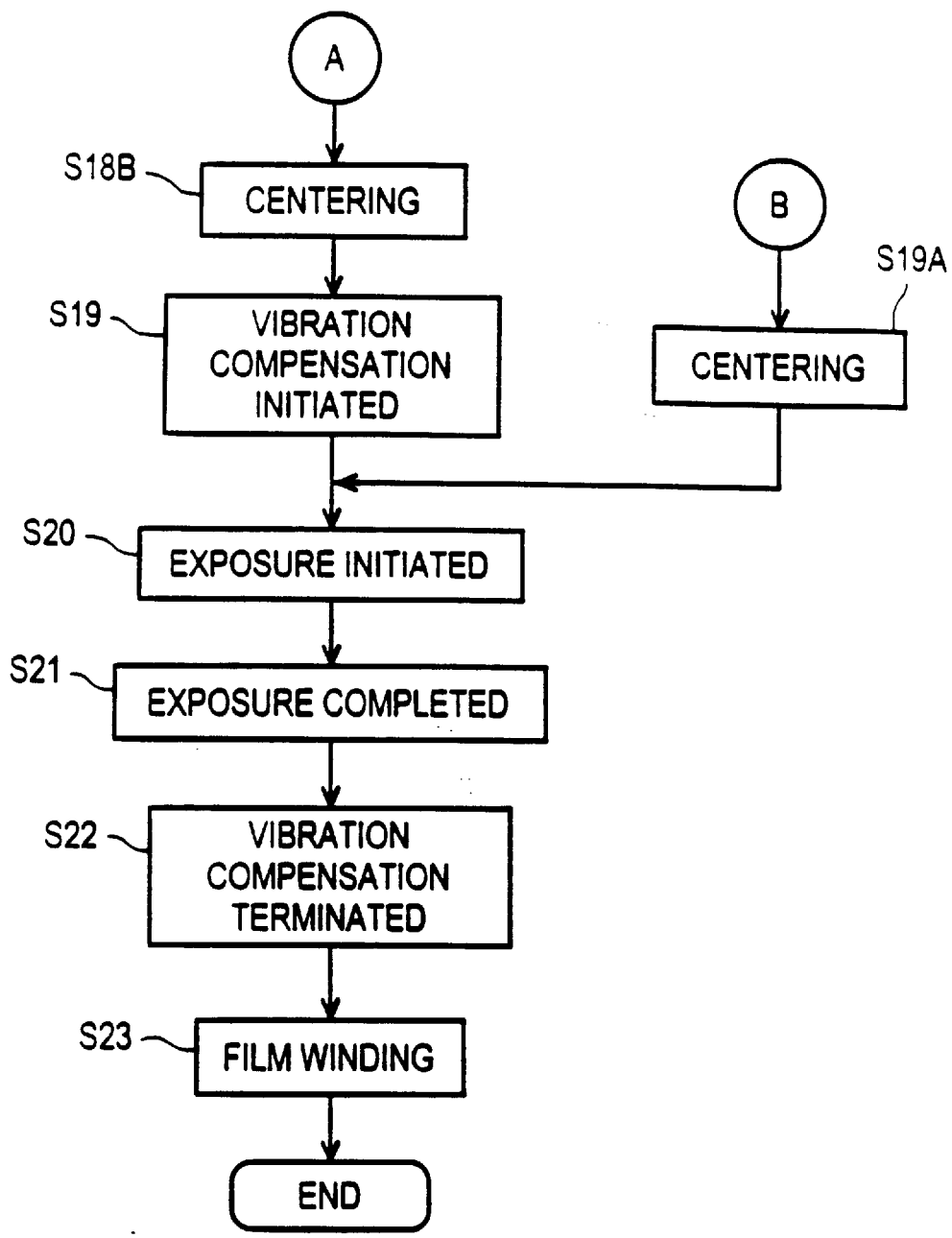
FIG. 7 is a flow chart showing the operation of a camera in accordance with the first preferred embodiment of the present invention.

FIG. 6 and FIG. 7 are flow charts showing the operation of the CPU 2. When the power source switch (not shown) of the camera is turned ON, the operation starts at step S1. In step S2, the system waits for the switch SW1 to go ON, by pushing the shutter release button 100 halfway. In step S3, the battery (not shown) charge is checked. If it is determined that the battery charge ("BC") is sufficient, the operation advances to step S4 and the vibration detection unit 1 is activated. Thereafter, in step S5, light measurement and distance measurement are conducted, and in step S6 it is determined whether the switch SW3 is ON.

If the switch SW3 is ON, in step S6, a flag F is set to 1 in step S7, and in step S8 the amount of camera vibration is compared to a specified value B. If the amount of camera vibration is less than or equal to the specified value B, the lamp 3 is lighted in step S9, and the operation proceeds to step S13. If the amount of camera vibration is greater than the specified value B, the lamp 3 is made to flash in step S12, and the operation advances to step S13.

If, on the other hand, the switch SW3 is OFF in step S6, the flag F is set to zero in step S10, and the shutter time obtained at step S5 is compared to a specified value A in step S11. If the shutter time is equal to or slower than the specified value A, a lamp 3 is made to flash in step S12, and the operation proceeds to step S13. If, in step S11, the shutter time is faster than the specified value A, the lamp 3 is lighted in step S12A, and the operation proceeds to step S13.

In step S13, automatic focusing is performed by driving the photographic optical system L2 along the optical axis. Thereafter, in step S14, the switch SW2 is checked. If the switch SW2 is OFF in step S14, the switch SW1 is again checked in step S18C. If the switch SW1 is ON in step S18C, the operation returns to step S6. If switch SW1 is OFF in step S18C, the lamp 3 is extinguished in step S24, and the operation returns to step S2.

If, in step S14, the switch SW2 is ON, the lamp 3 is extinguished in step S15. Next, the self-timer (not shown) is checked in step S16, and if the self-timer is set, the self-timer is thereafter started in step S17. Then in step S18 a wait time is waited, and the operation proceeds to step S18A. In step S18A, the flag F is checked, and if the flag F is zero, the operation proceeds to step S19A in FIG. 7. In step S19A, the vibration compensation lens group 5a is moved to the optical axis of photographic optical system L1, i.e. centered, and photography is initiated in step S20.

If, in step S18A, the flag F is not zero, because switch SW3 is ON, the vibration compensation lens group 5a is centered and in step S18B, vibration control is initiated in step S19, and thereafter photography is initiated in step S20. During vibration control in step S19, the vibration compensation unit 4 drives a drive system 5, and causes the vibration compensation lens group 5a to be moved perpendicular to the optical axis. Thereafter, in step S20, the CPU 2 commands the exposure control unit 10 to control the aperture, based on the output of the light measurement unit 7 by driving the aperture member 11, and the photograph is taken in step S21. In step S22, the CPU 2 commands the vibration compensation unit 4 to terminate vibration control. Thereafter, the vibration compensation unit 4 terminates the movement of vibration compensation lens group 5a by terminating the drive of drive system 5. In step S23, after photography has been completed, the film is wound by driving a film winding mechanism (not shown), and preparations are made for the next photograph. Thereafter, the operation is concluded.

Figure 8:
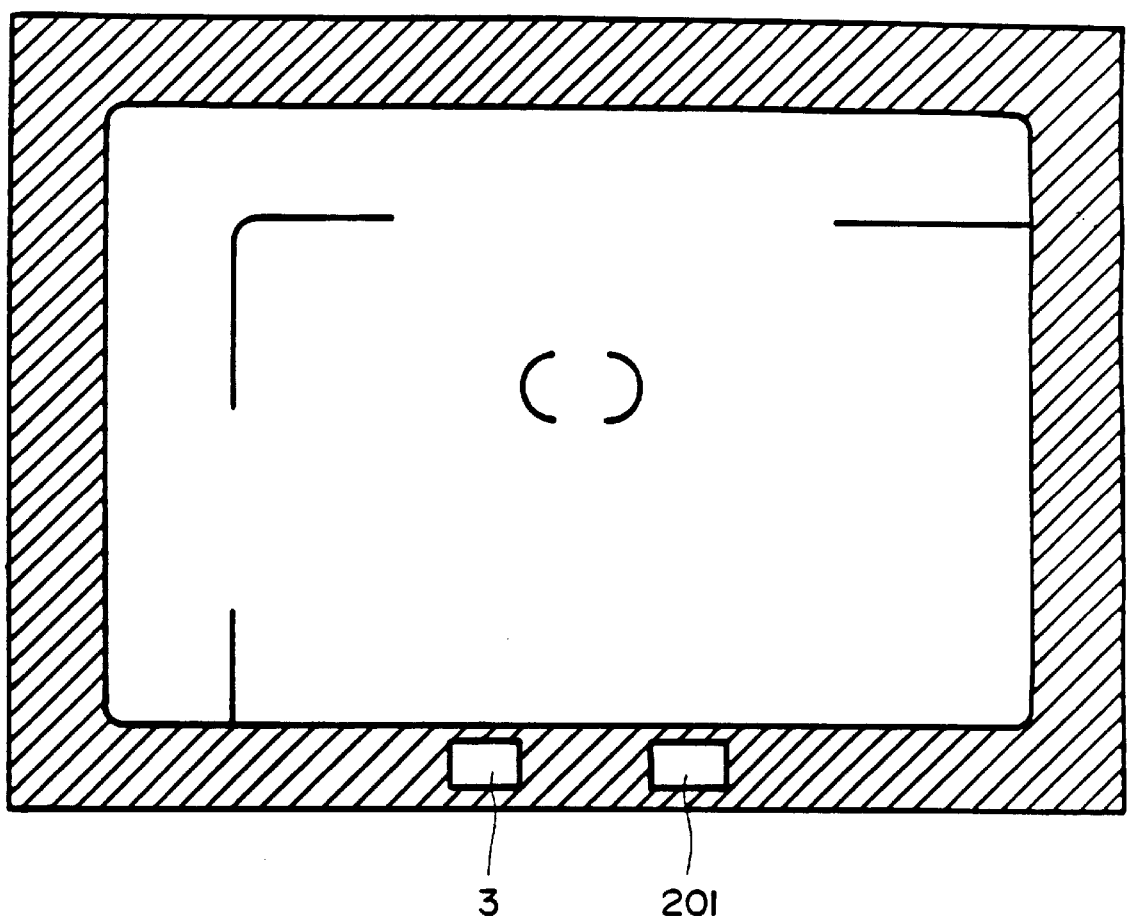
FIG. 8 is a diagram showing the display within the viewfinder of a camera according to the first preferred embodiment of the present invention.

FIG. 8 is a diagram showing a display in a viewfinder in accordance with the first preferred embodiment of the present invention. The lamp 3 is provided in the lower portion of the viewfinder next to a green lamp 201.

According to the first embodiment of the present invention, a self-return type external manipulation switch is provided as the vibration compensation selection switch SW3. If the switch SW3 is turned ON, the shutter release button 100 is depressed halfway and the switch SW3 is not turned ON after the shutter release button 100 is fully pushed, vibration compensation is still initiated. Moreover, when the shutter release button 100 has been pressed halfway, after light measurement and distance measurement have been conducted, a vibration warning is given if the shutter time, calculated from the light measurement results, is slower than the specified speed. Further, if the camera vibration status, given by the vibration detection unit exceeds a correctable range when the vibration compensation selection switch SW3 is ON, the vibration warning is also given.

In addition, because the vibration compensation selection switch SW3 is provided on the opposite side of the photographic lens from the shutter release button 100, and because the camera must always be held by two hands when turning the vibration compensation selection switch SW3 ON, the camera vibrations that accompany the termination of the vibration compensation operation can be, to a large degree, suppressed. It is therefore possible to conduct a vibration compensation operation in a camera that does not have a TTL viewfinder during the exposure operation. The vibration compensation device in accordance with the first preferred embodiment can be used together with a vibration warning display. Even if the vibration compensation device is not used, the warning that vibration is present is displayed after measurement is taken for determining shutter time. Because the detection output of the vibration detection unit is displayed on the display unit when the CPU 2 has produced an execution signal, the suitability for photography is displayed, and it is possible to prevent wasted photography.

Although the first embodiment of the present invention has been described with respect to a specific configuration, it will be recognized that the first embodiment is not limited to the specific configurations. For example, while the vibration detection unit 1 has been described as comprising an angular velocity sensor, it may also comprise a velocity sensor, an acceleration sensor, or an angular acceleration sensor. Further, while the light measurement unit 7 has been described as comprising a CCD, it may also comprise a set of light measurement elements, a set of optoelectric conversion elements, or a SPD.

Figure 9:
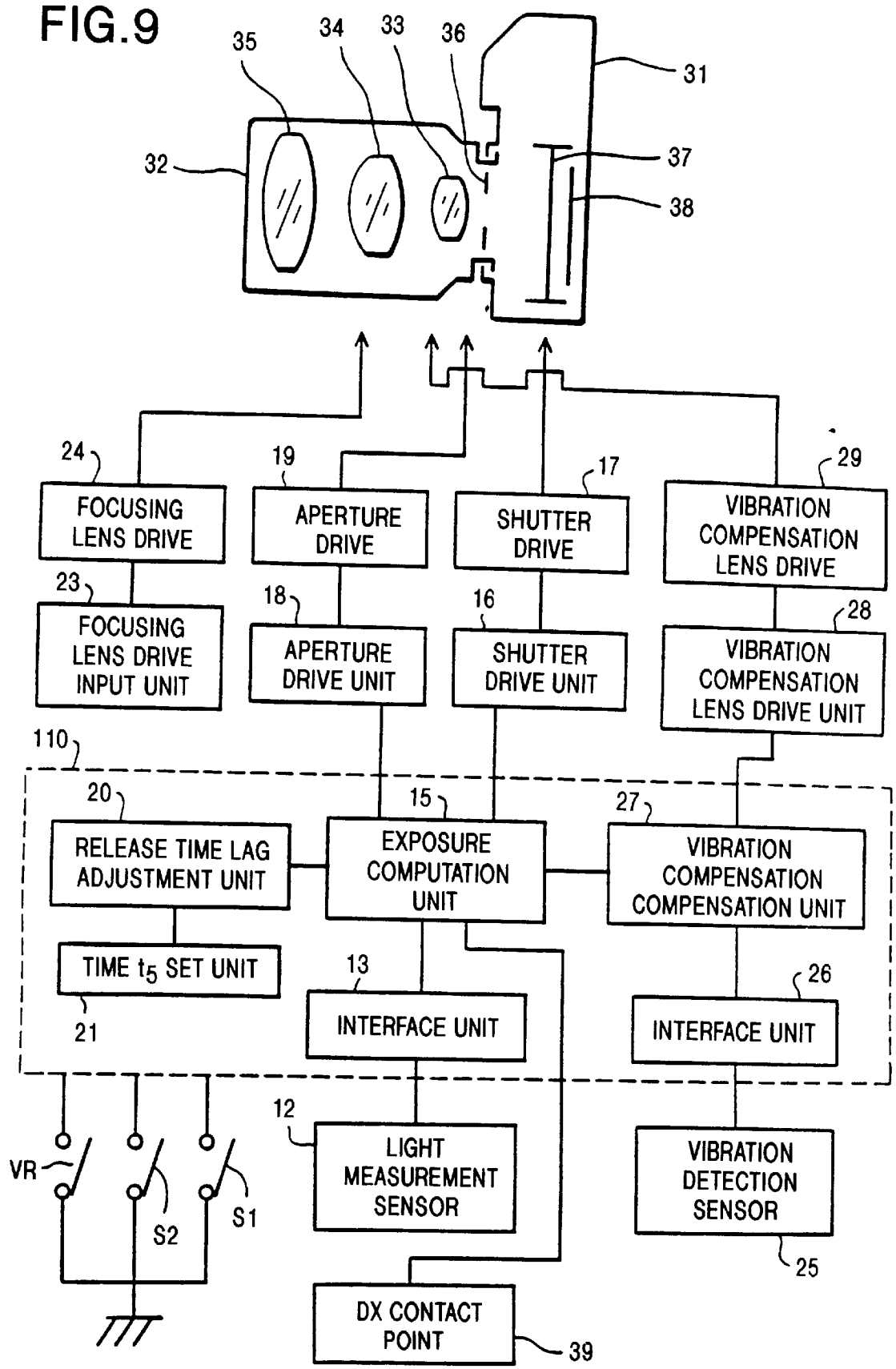
FIG. 9 is a block diagram showing a camera according to a second preferred embodiment of the present invention.

FIG. 9 is a block diagram of a camera system equipped with a vibration compensation device in accordance with a second preferred embodiment of the present invention. The camera system generally comprises a camera body 31, having a photographic lens 32. The vibration compensation device generally comprises a vibration compensation lens group 33, a vibration compensation lens drive 29, a vibration compensation lens drive unit 28, a vibration compensation computation unit 27 and a vibration detection sensor 25.

The camera system produces images on a photographic film 38, i.e. a memory medium, which is loaded in the camera body 31. A shutter 37, i.e. a memory operation device, positioned immediately in front of the photographic film 38, interrupts the light fluxes incident of the photographic film 38, and opens and closes, for a set exposure time, in response to a full press operation of the shutter release button which sets a switch S2. The vibration detection sensor 25 is positioned in the camera body 31 and detects the vibration in the camera system. The vibration detection sensor 25 preferably comprises, for example, an acceleration sensor, to detect acceleration of the camera body 31, an angular velocity sensor to detect rotational vibration centering on the rotational detection axis inside the sensor, or an angular acceleration sensor. It will be recognized that the vibration detection sensor 25 may also be positioned in the photographic lens 32.

The vibration detection sensor 25 preferably outputs a relative value indicating how much change there has been between a given detection value and a next detection value. The vibration compensation lens group 33, provided in the photographic lens 32, can drive one part of the photographic optical system in a direction perpendicular to the optical axis of the photographic optical system, based on the output of the vibration detection sensor 25, such that vibrations of the subject image, i.e. photographic image, on the plane of the photographic film 38 can be suppressed. The photographic lens 32 also contains a focusing lens group 34 which adjusts the focus by moving along the optical axis of the photographic optical system. Additionally, a fixed lens group 35 and an aperture 36 are provided in the photographic lens 32.

The light fluxes of the subject image are focused through the lens groups 35, 34, and 33, and fall upon the photographic film 38. A control unit 110, preferably comprising a computer, is incorporated into the camera body 31, or into the photographic lens 2, and controls the lens groups 33, 34, and 35, associated mechanisms, and the vibration compensation device. The control unit 110 preferably includes a one-chip microcomputer such as, for example, a CPU, which is a central processing unit for executing calculations and control, such as the exposure calculations, the vibration compensation calculations, and the focus adjustment control. The control unit 110 further comprises an exposure computation unit 15, the vibration compensation computation unit 27, a release time lag adjustment unit 20, a time $t_5$ set unit 21, an interface unit 13 connected to a light measurement sensor 12, and an interface unit 26 connected to the vibration detection sensor 25. Also connected to the control unit 110 is a series of switches VR, S2 and S1. The switches S2 and S1 are capable of discriminating the operation status of the release button similar to the switches SW2 and SW1 in the first embodiment, and the switch VR constitutes a vibration compensation selection unit to enable or disable vibration compensation, similar to the switch SW3 in the first embodiment.

The light measurement sensor 12 measures the brightness of the subject and outputs a signal to the exposure computation unit 15 through the interface unit 13. A DX contact point 39, positioned in the film chamber (not shown) of camera body 31, reads the DX code printed on the cartridge of photographic film 38 and outputs a signal to the exposure computation unit 15. The release time lag adjustment unit 20, and the vibration compensation computation unit 27 are also connected to the exposure computation unit 15. An aperture drive unit 18 and a shutter drive unit 16 are controlled by the exposure computation unit 15 to drive an aperture drive 19 and a shutter drive 17, respectively.

The exposure computation unit 15 computes a shutter speed and an aperture value based on the value read by the DX contact point 39 and the light measurement value output by the light measurement sensor 12. Based on the results of these computations, the aperture 36 is driven by the aperture drive unit 18 and the aperture drive 19 so as to open the aperture 36 to the desired aperture value and the shutter 37 is driven to be opened and closed by the shutter drive unit 16 and the shutter drive unit 17 at the desired shutter speed.

The time $t_5$ set unit 21 is connected to the release time lag adjustment unit 20. The time $t_5$ setting unit 21 is a setting part by which the time (called time $t_5$ below (first specified time)) is set in advance to be equal to the time from when the vibration detection sensor 25 initiates vibration detection upon the half push operation of the shutter release button thereby turning switch S1 ON, until the computation of where the angular velocity equals 0 is completed.

The release time lag adjustment unit 20 causes a release time lag to be the same when the operation of the vibration compensation device is permitted, i.e. a first selection state wherein the switch VR is ON, and when the operation of the vibration compensation unit is prohibited, i.e. a second selection state wherein the switch VR is OFF. Specifically, if the operation of the vibration compensation device is permitted in the first selection state, the release time lag adjustment unit 20 outputs the vibration compensation initiation command causing the vibration compensation device to be driven when the time elapsed from half push operation of the shutter release button (called time $t_2$ below) has reached the time $t_5$. Moreover, if the operation of the vibration compensation device is prohibited in the second selection state, the unit outputs the exposure initiation command to the exposure unit when a time has elapsed which equals the time $t_5$ and the time from the full push operation of the shutter release button when the operation of the vibration compensation device is permitted until exposure begins (called time $t_6$ below).

The vibration compensation computation unit 27 computes where the angular velocity equals 0, which is the previously described standard, based on the output of the vibration detection sensor 25. By computing where the angular velocity equals 0, the absolute value is set as a standard. In addition, based on the results of this computation, the direction and the amount of drive for the vibration compensation lens group 33 is computed so that the subject image on the plane of the photographic film 38 does not blur, in other words, so that the vibration is cancelled out. Then, the computational output of the vibration compensation computation unit 27 is fed to the vibration compensation lens drive unit 29 through the vibration compensation lens drive unit 28. The vibration compensation lens drive 29 comprises, for example, a motor, etc., and causes the vibration compensation lens group 33 to be driven in the computed direction and for the computed amount of drive for the vibration compensation lens group 33.

To adjust the focal point of the photographic lens 32, the amount of drive for focusing lens group 34 is computed by a focal point detection computational unit (not shown) based on the detection results of a focal point detection unit (not shown). The results of the focal point adjustment computation are entered into the focusing lens drive input unit 23. One of ordinary skill in the art will recognize that the photographer may instead choose to manually focus lens drive input unit 23. Furthermore, the photographer may also manually enter an amount that was set using a focusing screen. The focusing lens drive 24 transmits the amount of drive entered into the focusing lens drive input unit 23 to the focusing lens group 34, and obtains the desired focal point by moving the focusing lens group 34 along the optical axis.

Moreover, the exposure computation unit 15 and the vibration compensation computation unit 27, by mutually exchanging signals, control a series of operations from after a full push operation of the shutter release button until the subject image is exposed on the photographic film 38.

In addition, when the operation of the vibration compensation unit is prohibited, vibration compensation is not conducted and exposure for the specified exposure time can be conducted after the specified time generated by the release time lag adjustment unit 20 has elapsed.

The switches S2 and S1 are linked to the operation of the shutter release button, and can discriminate the operation status of a half push operation of the shutter release button (switch S1) and the full push operation of the shutter release button (switch S2). The vibration compensation selection unit, i.e. the switch VR, is a selection unit that selects an ON state when the operation of the vibration compensation unit is permitted, i.e. the first selection state, or an OFF state when the operation of the vibration compensation unit is prohibited, i.e. the second selection state.

Figure 10:
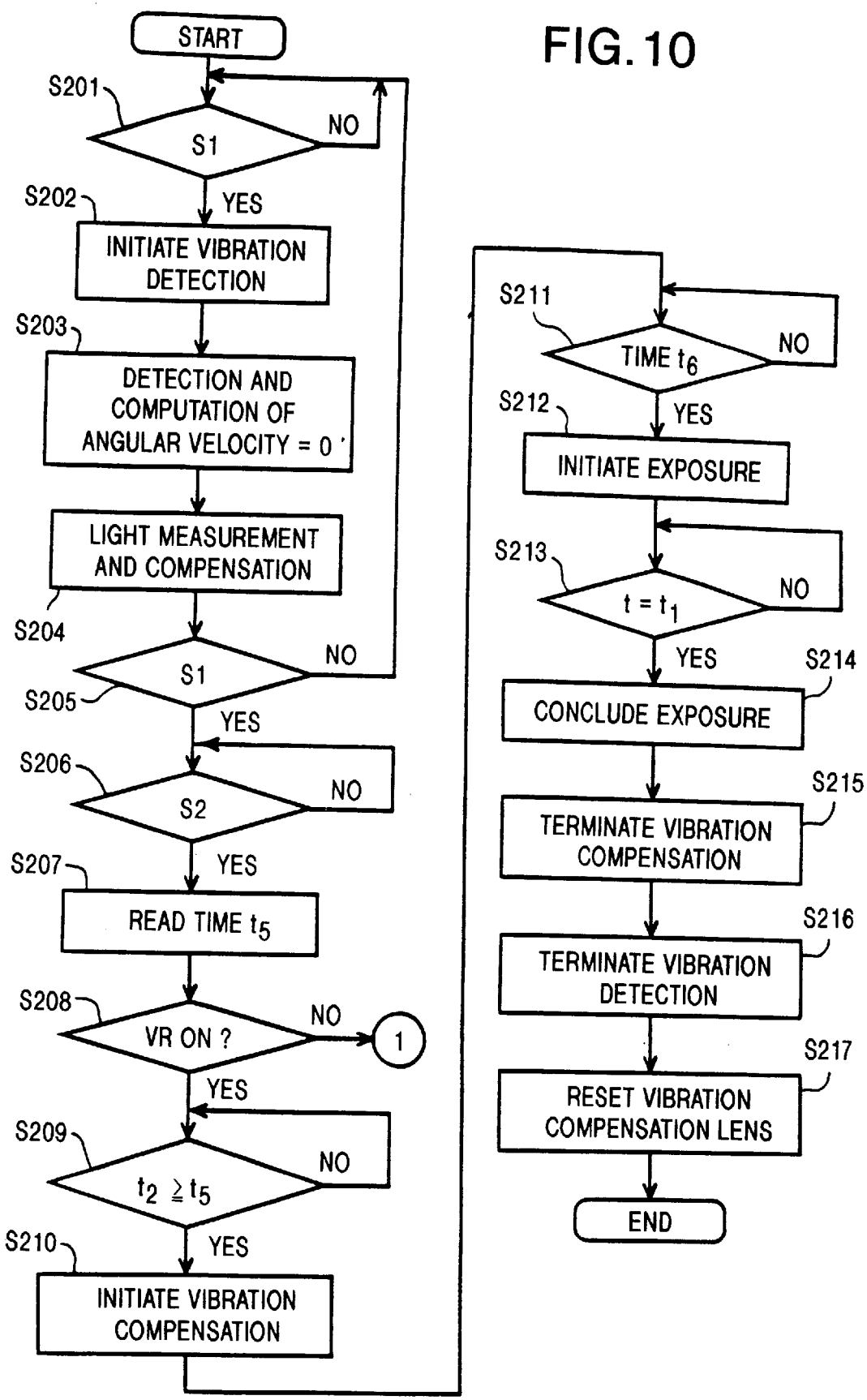
FIG. 10 is a flow chart showing the operation of a control unit in a camera according to the second preferred embodiment of the present invention.
Figure 11:
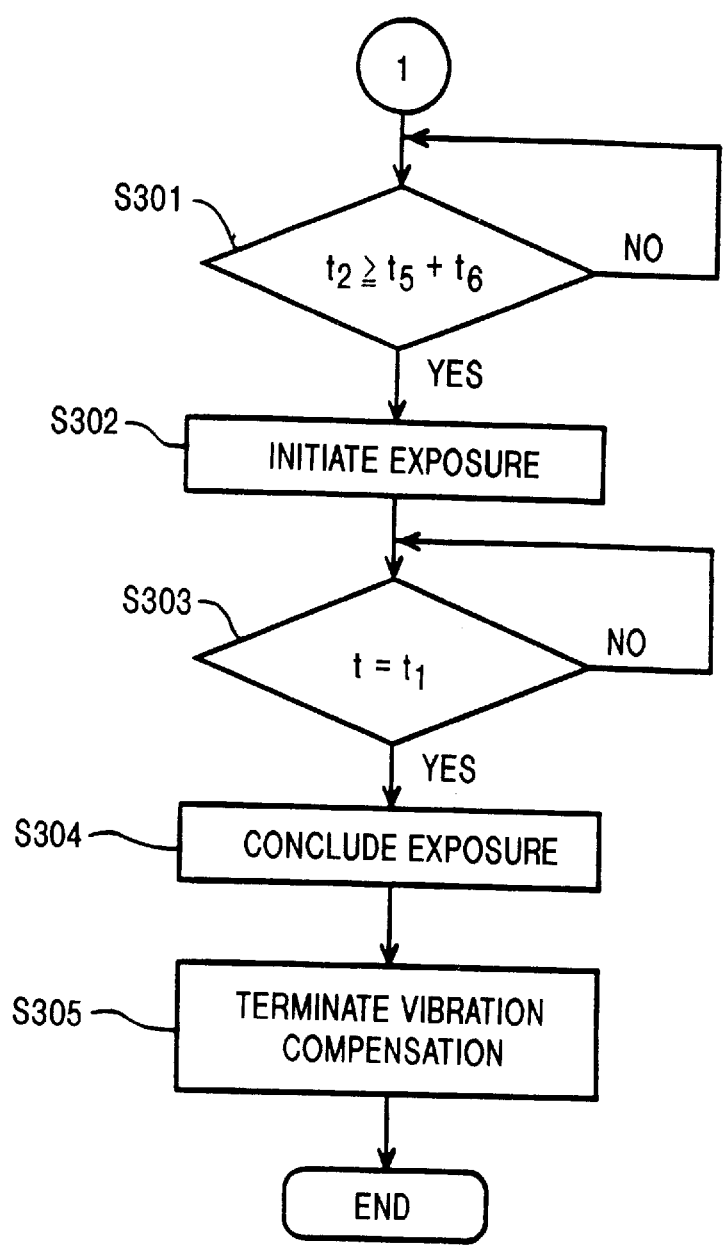
FIG. 11 is a continuation of the flow chart shown in FIG. 10.

FIG. 10 and FIG. 11 are flow charts showing the photographic operation of the control unit 110 in accordance with the second embodiment of the present invention. The operation begins at half push operation of the shutter release button, i.e. the switch S1 is turned ON. As set forth in FIGS. 10 and 11, the half push operation of the shutter release button will be abbreviated as "S1", and the full push operation of the shutter release button will be abbreviated as "S2". The control unit 110 causes the photographic processing to begin at START on power ON. Then in step S201, it is determined whether the photographer has half pushed (S1) the shutter release button. If S1 is ON, operation advances to S202. If S1 is OFF, operation returns to START. Next, in step S202, vibration detection is begun by supplying power to the vibration detection sensor 25, and the operation advances to step S203. In step S203, the vibration compensation computation unit 27 computes the standard angular velocity equals 0 based on the output of the vibration detection sensor 25 and the operation advances to step S204. In step S204, the exposure computation unit 15 measures the contrast of the subject using the light measurement sensor 12, and reads in the ISO sensitivity of photographic film 38 from the DX code that is listed on the cartridge of photographic film 38 using the DX contact point 39. Then, light measurement computations are conducted by the exposure computation unit 15, and the operation advances to step S205.

In step S205, it is once again determined whether the switch S1 is ON. If the switch S1 is ON, the operation advances to step S206. If the switch S1 is OFF, the operation returns to START. Next, in step S206, it is determined whether the release button has been fully pressed turning switch S2 ON. If switch S2 is ON, operation advances to step S207. If the switch S2 is OFF, the operation returns to step S206. Next in step S207, the set value of time $t_5$ is read in as the time until the computations are complete for angular velocity equals 0, which was previous set by time $t_5$ set unit 21, and the operation advances to step S208.

In step S208, it is determined whether the vibration compensation selection unit i.e. switch VR, is ON. If the switch VR is ON, the operation advances to step S209. If the switch VR is OFF, operation advances to step 301 in FIG. 11. Next, in step S209, it is determined whether a time $t_2$, which is the time elapsed from the switch S1 turning ON until detection of where the angular velocity equals 0 is completed, has reached time $t_5$. If the time $t_2$ has elapsed, the operation advances to step S210. If the time $t_2$ has not elapsed, the operation returns to step S209. Because the operation waits until time $t_5$ is achieved, inasmuch as the standard angular velocity equals 0 for vibration compensation drive is reliably detected even when the switch S2 is turned ON immediately after the switch S1, the vibration compensation device can be reliably operated. Moreover, if the time $t_2$ has elapsed, the S1 has been ON sufficiently long, and if the time until the switch S2 turns ON takes more than time $t_5$, it is configured to output the vibration compensation initiation signal immediately after the switch S2 goes ON.

Next, in step S210, the vibration compensation initiation command for initiating vibration compensation is output, and the operation advances to step S211. In step S211, it is determined whether a time $t_6$, which is equal to time required from the vibration compensation initiation command to the initiation of vibration compensation has elapsed. If the time $t_6$ has elapsed, operation advances to step S212. If the time $t_6$ has not elapsed, operation returns to step S211.

Next, in step S212, the drive of the vibration compensation lens 33 is initiated by the vibration compensation lens drive unit 29. Then, the exposure computation unit 15 initiates exposure by causing the aperture 36 and the shutter 37 to be driven according to the previously calculated values, and the operation advances to step S213. In step S213, it is determined whether the elapsed time from the initiation of exposure (called "t" below) has reached the complete exposure time (called "$t_1$" below). If t has reached $t_1$, operation advances to step S214. If t has not reached $t_1$, the operation returns to step S213.

In step S214, the exposure computation unit 15 immediately causes exposure to be concluded by again driving aperture 36 and shutter 37, and the operation advances to step S215, the vibration compensation computation unit 27 outputs a termination signal for terminating vibration control of the vibration compensation lens drive unit 28, and the vibration compensation lens group 33, and the operation advances to step S216. In step S216, the power supply to the vibration detection sensor 25 is cut off, vibration detection is terminated, and the operation advances to step S217. In step S217, the vibration compensation lens group 33 is reset, and the series of operations involving photography are completed.

FIG. 11 is a continuation of the flow chart shown in FIG. 10. If in step S208, the switch VR is not ON, the operation proceeds to step S301 in FIG. 11. In step S301, it is determined whether a time $t_2$, which is the time elapsed from the half push of the shutter release button, i.e. when the switch S1 is turned ON, is equal to or greater than the total of time $t_5$ and time $t_6$, in which case operation advances to step S302. If $t_2$ is less than time $t_5$ plus time $t_6$, the operation returns to step S301. Here, the release time lag from the full press of the shutter release button, i.e. from when the switch S2 goes ON, until exposure is the same as the release time lag when the switch VR is turned ON. By doing this, because the time lag is the same, photography can be initiated with the same release timing lag irrespective of whether or not the switch VR is ON or OFF.

Next, in step S302, the exposure computation unit 15 initiates exposure by driving the aperture 36 and the shutter 37, and the operation advances to step S303. In step S303, it is determined whether the time t which has elapsed from after the initiation of exposure has reached the full exposure time $t_1$. If the time t equals the time $t_1$, operation advances to step S304. If the time t is less than the time $t_1$, the operation returns to step S303. In step S304, the exposure computation unit 15 immediately concludes exposure by again driving the aperture 36 and the shutter 37, and the operation advances to step S305. In step S305, vibration detection is terminated, and the photographic operation is thereafter concluded.

Although the second embodiment of the present invention has been described with respect to a specific configuration, it will be recognized that the second embodiment is not limited to the specific configurations. For example, the time $t_5$ is the time until the point where angular velocity equals 0 is detected by the vibration detection sensor 25 and calculated by the vibration compensation computation unit 27. However, this time depends on the precision used in calculating where the angular velocity equals 0, and as such the time $t_5$ may be changed by the time $t_5$ set unit 21. Consequently, the precision calculating where the angular velocity equals 0, can be raised by making the time $t_5$ sufficiently large, and, of course, the converse can be done.

Figure 13:
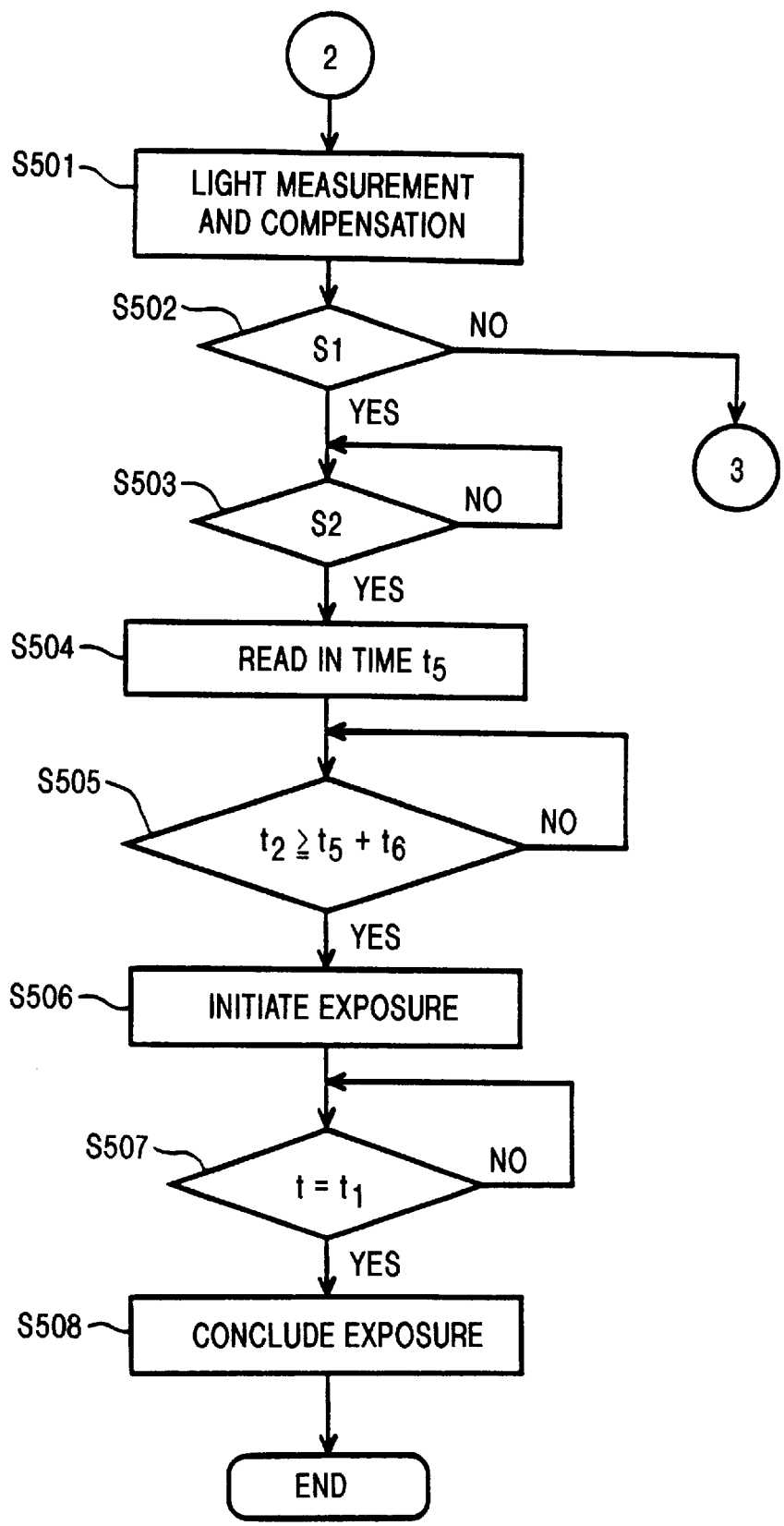
FIG. 13 is a continuation of the flow chart shown in FIG. 12.

FIG. 12 and FIG. 13 are flow charts showing the photographic operation by the control unit 110 in accordance with a third embodiment of the present invention. The operation of the control unit 110 is started by the switch S1 being turned ON in step S401. If the switch S1 is ON, the operation advances to step S402. If the switch S1 is OFF, the operation returns to START. Next, in step S402, it is determined whether the vibration compensation selection unit, i.e. the switch VR, is ON. If the switch VR is ON, the operation advances to step S403. If the switch VR is OFF, the flow advances to step S501 in FIG. 13. Next vibration detection begins in step S403, by supplying power to the vibration detection sensor 25, and the operation advances to step S404. In step S404, the vibration compensation computation unit 27 computes where the angular velocity equals 0, based on the output of angular velocity sensor 25, and the operation advances to step S405. In step S405, the exposure computation unit 15 measures the brightness of the subject using the light measurement sensor 12, and reads the ISO sensitivity of photographic film 38 from the DX code that is listed on the cartridge of photographic film 38 using the DX contact point 39. Then, light measurement computations are performed by the exposure computation unit 15, and the operation advances to step S406. In step S406, it is determined whether the shutter release button is still half pressed, i.e. if the switch S1 is ON. If the switch S1 is still ON, the operation advances to step S407. If the switch S1 is OFF, the operation returns to START. Next, in step S407, it is determined whether the release button has been fully pressed, thereby turning the switch S2 ON. If the switch S2 is ON, the operation advances to step S408. If the switch S2 is OFF, the operation returns to step S407. Next, in step S408, the set value of time $t_5$ is read in as the time up to the completion of the computation of where the angular velocity equals 0 that was previously set by time $t_5$ set unit 21, and the operation advances to step S409.

The explanation of the operations from step S409 through step S417 will be omitted because they are the same as the operations from step S209 through step S217 as previously described with respect to the second embodiment and FIG. 10.

FIG. 13 is a continuation of the flow chart in FIG. 12. In step S501, the exposure computation unit 15 measures the brightness of the subject utilizing the light measurement sensor 12, and uses the DX contact point 39 to read in the ISO sensitivity of the photographic film from the DX code listed on the cartridge of photographic film 38. Then, light measurement computations are executed by exposure computation unit 15, and the operation advances to step S502. In step S502, it is determined whether the release button is still half pressed, i.e. switch S1 is ON. If the switch S1 is ON, the operation advances to step S503. If the switch S1 is OFF, the operation returns to step S401 in FIG. 4. Next, in step S503, it is determined whether the release button has been fully pressed, thereby turning switch S2 ON. If the switch S2 is ON, operation advances to step S504. If the switch S2 is OFF, the operation returns to step S503. Next, in step S504, the set value for time $t_5$ is read in as a time up to the completion of computing where the angular velocity equals 0 which is previously set using time $t_5$ set unit 21, and the operation advances to step S505. In step S505, it is determined whether the time $t_2$, which is the time elapsed from when switch S1 goes ON, is equal to or greater than the time $t_5$ plus the time $t_6$ the switch VR is ON, and if so, the operation advances to step S506. If the time $t_2$ is less than the time $t_5$ plus the time $t_6$, the operation returns to step S505. Thus, the release timing from the full push operation of the shutter release button until exposure begins is the same time as the release timing for when the switch VR is ON. Because the delay is the same time, irrespective of whether or not the operation of switch VR is ON or OFF, photography can begin with the same release timing.

Next, in step S506, the exposure computation unit 15 initiates exposure by driving the aperture 36 and the shutter 37, and the operation advances to step S507. In step S507, it is determined whether the time t which has elapsed after initiating exposure has reached the full exposure time $t_1$. If the full exposure time has elapsed, the operation advances to step S508. If the full exposure time has not elapsed, operation returns to step S507. In step S508, the exposure computation unit 15 immediately concludes exposure by again driving the aperture 36 and the shutter 37, and the photographic operation is completed.

In accordance with the third preferred embodiment, the power consumption of the power battery, incorporated in camera body 31, can be suppressed when the vibration compensation selection unit, i.e. the switch VR, is turned ON, because the operation of the vibration detection sensor 25 (angular velocity sensor) is prohibited.

Although the third embodiment of the present invention has been described with respect to a specific configuration, it will be recognized that the third embodiment is not limited to the specific configuration. For example, the time $t_5$ is the time required to detect where the angular velocity equals 0 by the vibration detection sensor 25 and the vibration compensation computation unit 27. However, the time required to detect where the angular velocity equals 0 depends on the precision required, which may be modified by the time $t_5$ set unit. Consequently, to increase the precision of detecting where the angular velocity equals 0, the time $t_5$ may be set sufficiently large, and, of course, the converse may be done.

According to the second and third preferred embodiments of the present invention, the photographer may conduct photography with the same feeling irrespective of the operation status of the vibration compensation unit. The photographer can easily obtain photographs which accurately reflect the photographer's intentions because photographs are taken with the same timing, upon external manipulation of the shutter release button, irrespective of whatever the vibration compensation unit is operational.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A vibration compensation device suitable for use in an optical imaging system to reduce blur in the image during exposure, said vibration compensation device comprising:

a vibration detection unit to detect vibrations which would blur the image;

a vibration compensation unit to compensate for vibrations;

a vibration compensation selection switch having a first position to indicate that said vibration compensation unit should be enabled during exposure and a second position to indicate that said vibration compensation unit should be disabled during exposure; and a control unit to cause said vibration detection unit to detect vibrations in response to a half press of a release button in conjunction with said vibration compensation switch being in the first position, and if said vibration compensation selection switch enters the first position at any time subsequent to the half press and prior to a full press of the release button to cause said vibration compensation unit to compensate for the vibrations detected by said vibration detection unit even if said vibration compensation selection switch is in the second position when the release button is fully pressed and exposure is initiated.

2. A vibration compensation device, as set forth in claim 1, wherein the vibration compensation device is positioned within a camera having a lens.

3. A vibration compensation device, as set forth in claim 2, wherein the release button is provided on an opposite side of the lens from the vibration compensation selection switch.

4. A vibration compensation device suitable for use in an optical imaging system to reduce blur in the image during exposure, said vibration compensation device comprising:

a vibration detection unit to detect vibrations which would blur the image;

a vibration compensation unit to compensate for vibrations;

a vibration compensation selection switch having a first position to enable said vibration compensation unit and a second position to disable said vibration compensation unit; and a control unit to initiate exposure after a time period has elapsed upon the full press of a release button, the time period being the same when said vibration compensation selection switch is in the first position and when said vibration compensation switch is in the second position.

5. A vibration compensation device, as set forth in claim 4, wherein when said vibration compensation switch is in the first position, said control unit waits a first time period in which said vibration detection unit is initialized and thereafter waits a second time period in which said vibration compensation unit begins to operate prior to initiating exposure.

6. A vibration compensation device, as set forth in claim 5, wherein when said vibration compensation switch is in the second position said control unit waits a period of time equal to the first time period plus the second time period prior to initiating exposure.

7. A vibration compensation device, as set forth in claim 4, wherein the vibration compensation device is provided in a camera for producing images on a photographic film in response to the pressing of the release button.

8. A vibration compensation device, as set forth in claim 4, wherein said vibration detection unit is adapted to detect rotational movement centered about a specified axis.

9. A vibration compensation device, as set forth in claim 4, wherein said vibration detection unit is an angular velocity sensor.

10. A method of exposing an image in an optical system comprising:

detecting vibrations which would cause blur in the image when a user half presses a release button;

displaying an indication to the user of the detected vibrations;

repeatedly determining, after the user half presses the release button, whether the user desires to compensate for detected vibrations;

initiating exposure of the image upon the full press of the release button and compensating for the detected vibrations if the user desires to compensate for vibrations; and initiating exposure of the image upon the full press of the release button if the user does not desire to compensate for vibrations and compensating for vibrations if it was determined at any time after the half press and prior to the full press of the release button that the user desired to compensate for the detected vibrations.

11. A method of exposing an image comprising:

identifying whether a user desires to compensate for vibrations while exposing the image;

if the user does not desire to compensate for vibrations, initiating exposure of the image after a first period of time, from when the user indicates that an exposure should be initiated; and if the user desires to compensate for vibrations, initiating exposure of the image after a second period of time from when the user indicates that an exposure should be initiated, during which vibrations are detected and preparations are made to compensate for vibrations during the exposure, the second period of time being equal to the first period of time.

12. A method, according to claim 11, wherein when the user indicates that an exposure should be initiated and vibrations were detected and preparations made to detect vibrations during a half press operation, prior to the user indicating that an exposure should be initiated, the time from when the user indicates than an exposure should be initiated and the initiating of the exposure still being equal to the first time period.

* * * * *